Aug. 11, 1931.     R. A. JONES     1,818,065
PACKAGE ASSEMBLING MACHINE
Filed June 26, 1929     10 Sheets-Sheet 8
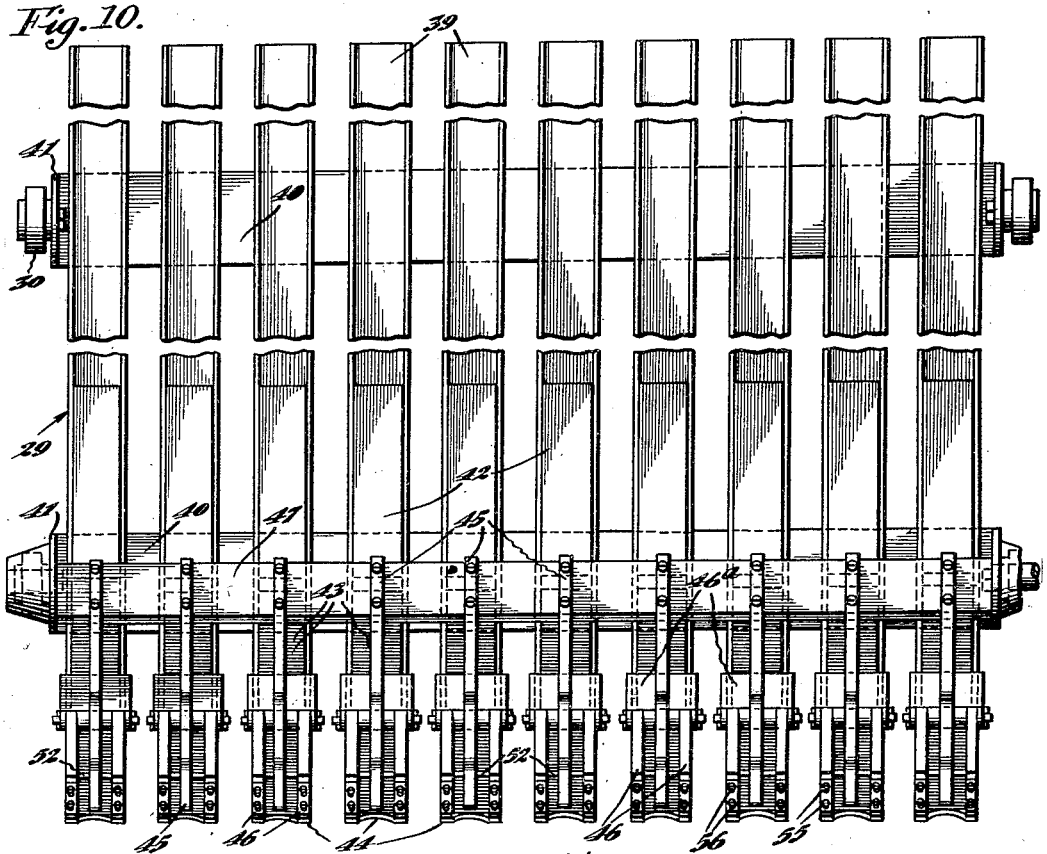
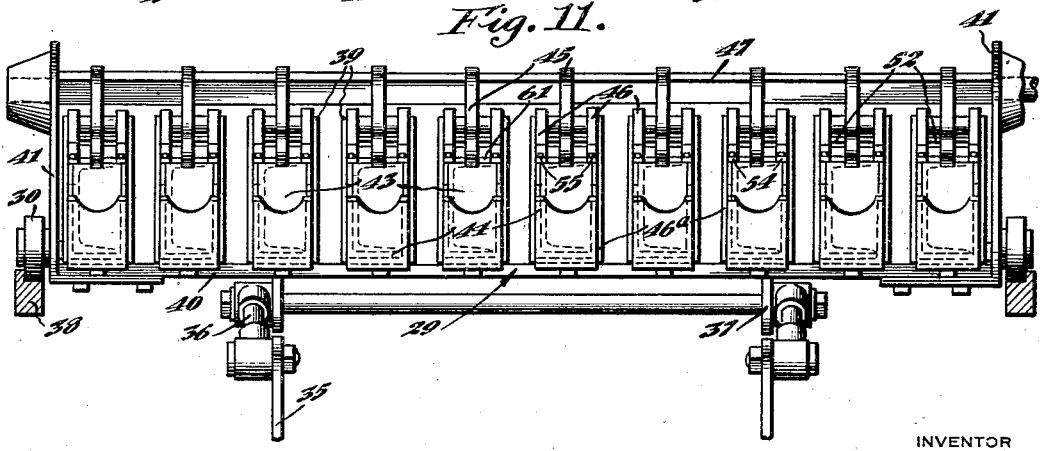
INVENTOR
Ruel A. Jones
BY
Wood & Wood ATTORNEYS Aug. 11, 1931.  R. A. JONES  1,818,065
PACKAGE ASSEMBLING MACHINE
Filed June 26, 1929    10 Sheets-Sheet 9

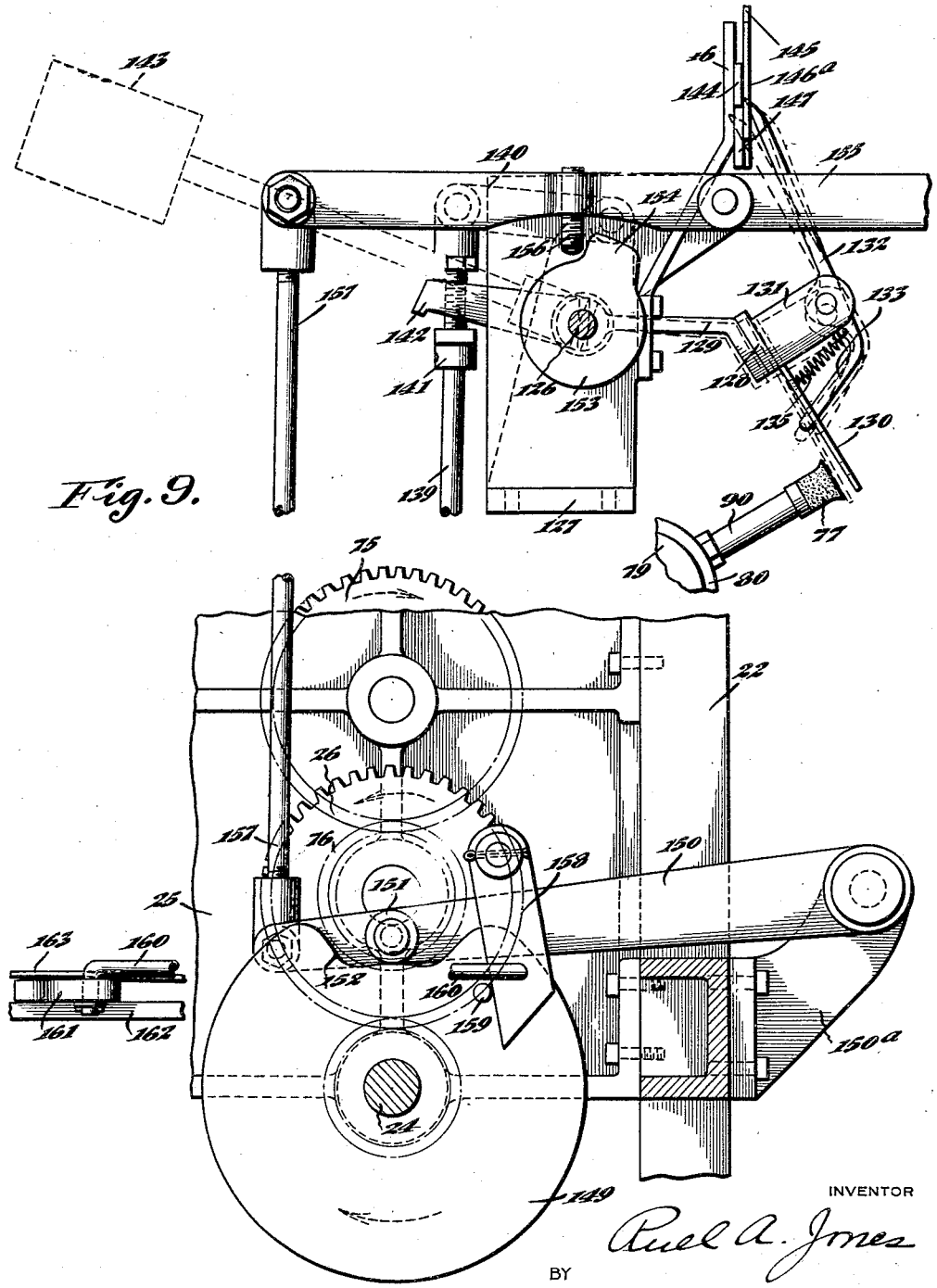

INVENTOR
Ruel A. Jones
BY
Wood & Wood ATTORNEYS

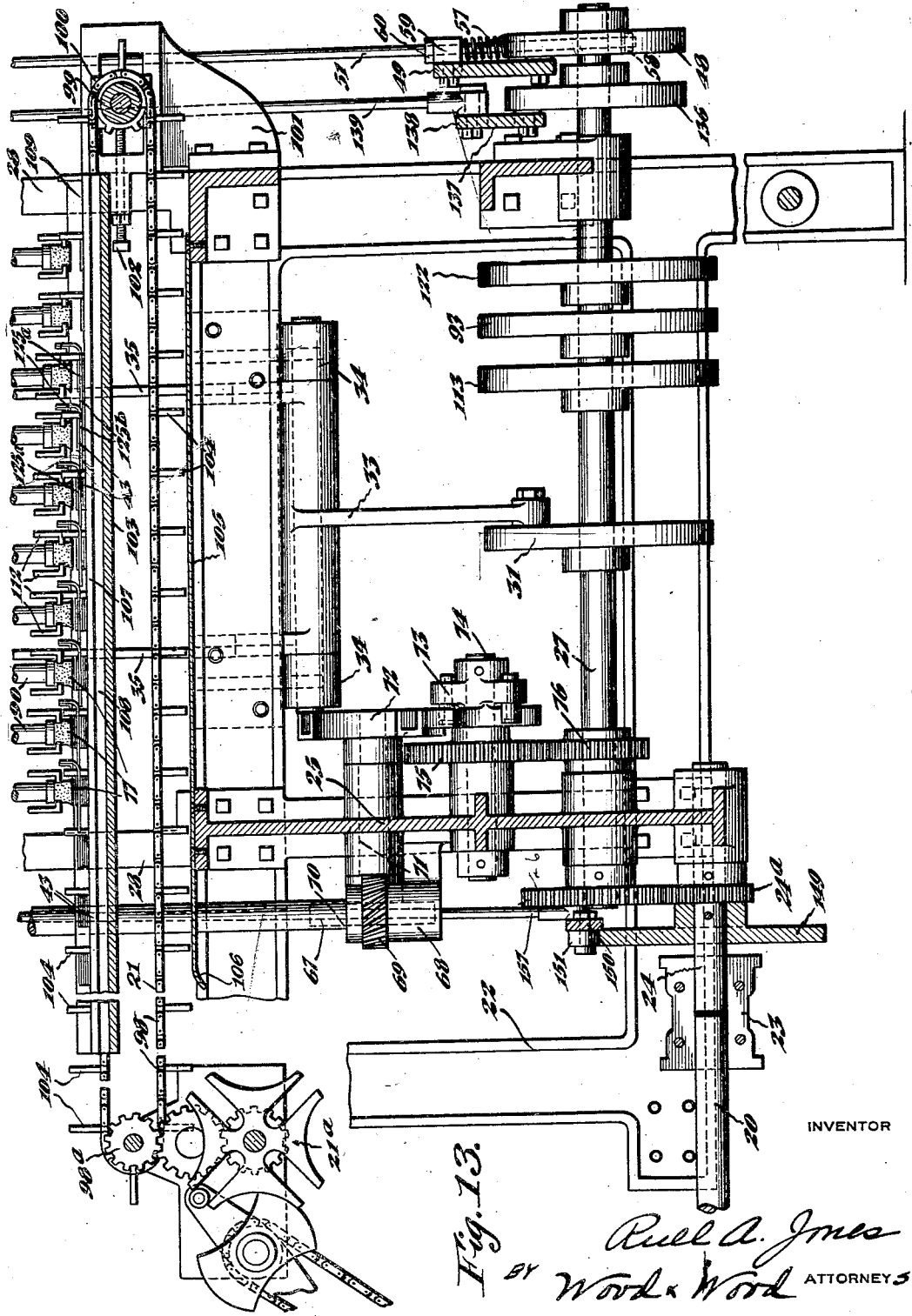

Patented Aug. 11, 1931

1,818,065

UNITED STATES PATENT OFFICE

RUEL ANDERSON JONES, OF COVINGTON, KENTUCKY, ASSIGNOR TO R. A. JONES & COMPANY, INC., OF COVINGTON, KENTUCKY, A CORPORATION OF KENTUCKY

PACKAGE ASSEMBLING MACHINE

Application filed June 26, 1929. Serial No. 373,815.

This invention relates to automatic machinery, and is particularly directed to a machine for accurately counting and assembling or grouping packages or articles. The machine of the present invention may be used preparatory to the insertion of the grouped packages in cartons and the groups of packages conveyed into the cartoning machine from this machine.

It is, therefore, an object of this invention to provide a machine which extracts the packages or articles from a plurality of magazine chutes and transfers them to a conveyor, and during which transfer, the synchronous movements and relation of the transfer device and the conveyor effect the desired assembling or grouping of the packages in stacks of the proper number periodically along the conveyor.

It is another object of this invention to automatically detect any miscount of packages, to warn the operator and to prevent inaccurate grouping by automatically stopping the feed through a device actuated by the detector.

Another object is to provide a detector mechanism which also functions in handling the packages to check up on the condition of the package to determine whether or not it is filled and which cuts off the power if an empty package is fed into the machine.

The machine, in the particular instance set forth, is designed to handle packages containing razor blades, and the packages are, therefore, relatively flat and frail and require cautious handling. For this reason, it is another object of the invention to provide a mechanism which operates on the stacks of packages in the magazine to enable the transfer mechanism to delicately and unerringly extract a single package from each chute of the magazine; to provide a positive delivery mechanism for stripping the packages from the transfer mechanism in aid of the primary release mechanism; and to provide a device for obtaining true alignment of the packages being grouped in the conveyor.

Other objects relate to the general features of construction which will be more fully set forth in the description of the accompanying drawings, in which:

Figure 9 is a fragmentary view of the machine illustrating the power throw-out mechanism in tripped position.

Figure 10 is a top plan view of the magazine.

Figure 11 is a front view thereof.

Figure 12 is a sectional view taken on line 12—12, Figure 2, further illustrating the upper portion of the machine.

Figure 13 is a sectional view taken on line 13—13, Figure 2, further detailing the lower portion of the machine and showing the driving means for imparting intermittent movement to the conveyor.

Figure 1:
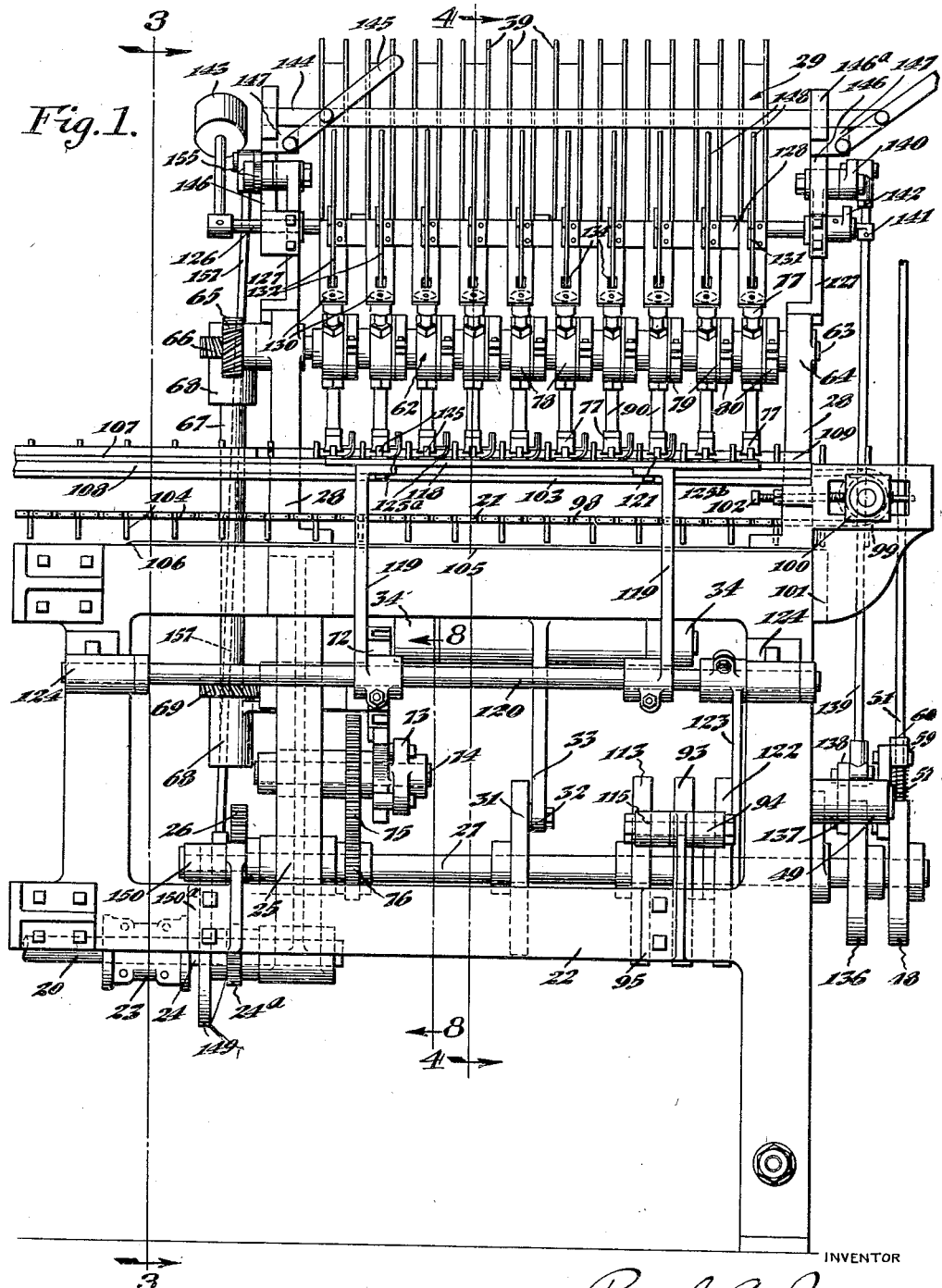
Figure 1 is a front elevation of the machine.

The machine as illustrated is designed for the purpose of handling and grouping, for packing, packages containing razor blades, it being understood, however, that the invention is intended to include any utility to which it may be put within the range of the mechanisms claimed.

The machine, described in general, includes a rotary transfer device having intermittent 120° revolution motion. The rotary device has rows of radially extending suckers, the rows disposed at 120° apart and the air to the suckers being valve controlled. The rotary device, therefore, provides three positions or stations for each row of suckers, at which stations the various operations are performed on the packages for counting the same, checking the count, and grouping the same in predetermined lots.

Therefore, at the first station a magazine is moved relative to the suckers of a row to dispose a package on each sucker. The second station of the rotary device provides the testing point where a checking apparatus tests the row of suckers to determine that each one carries a package and that each package contains an article, this checking mechanism incorporating a power throw-out device in the event that the suckers are improperly loaded. The third station of the suckers is immediately above an intermittent motion conveyor moving longitudinally of the row and therebeneath. The movement of the conveyor is timed so that between the times at which the packages are released from a row of suckers, the conveyor will be moved forward to bring up the receptacles of the conveyor so that the packages are progressively stacked in the conveyor, the one leaving containing the desired number of packages and the first containing one package.

For the purpose of a detailed description, the present machine is described as a series of devices or mechanisms performing successive operations on the articles to be counted and grouped for packing. The order of description of the mechanisms as now set forth is the order in which the operations take place, from the extraction of the articles from a magazine to the bunching of the same in counted groups for insertion in the carton.

Primarily the articles are loaded in the magazine mechanism which incorporates a general magazine movement and includes various secondary movements for the proper extraction of the articles from the magazine. The rotary transfer device cooperates with the magazine movement, picking a plurality of articles from the magazine and depositing the same on an endless conveyor, which conveyor includes as accessory movements, an aligning device for accurately placing the articles in the conveyor, and a mechanism for stripping the articles from the rotary conveyor.

During the counting or transfer of the articles from the magazine to the endless or grouping conveyor in which they are stacked or bunched to make a given count, a checking or detecting mechanism acts upon the rotary carrier and at one stage of the rotative movement of the conveyor tests each carrier thereof, whereby if one of the carriers of the conveyor has failed to convey a package containing the article or if the package should happen to be empty, the power is cut off and the failure to properly count is detected.

The count is obtained by having a plurality of magazine chutes and a corresponding number of carriers, or suckers as shown, whereby the carrier simultaneously extracts the articles from the respective chutes of the magazine. The endless conveyor, moving laterally beneath the rotary conveyor, has an intermittent motion whereby each time its stops beneath the loaded carriers an article is dropped from the rotary conveyor into each division of the conveyor beneath the rotary device. As the conveyor is moved forward the distance between carrier elements on the rotary conveyor the simultaneous dropping of the articles occurs again, the result being that the most advanced division or the one just leaving the last carrier of the rotary conveyor has the desired number of articles disposed therein with the number in the division, coming up, decreasing to one in the last, as previously set forth.

The machine herein disclosed is adapted to be used in combination with a carbon filling machine and for that reason the power source, which is in the carton filling machine is not disclosed, the end of the power shaft extending from the power source into the present machine being illustrated at 20. For the above reason also, the conveyor 21 carrying the grouped packages or articles is shown broken off at the point at which it enters the carton machine and it will be understood that this conveyor moves the articles, grouped by the present invention, into the environment of the carton filling mechanism which constitutes the subject matter of a separate invention. The Geneva movement 21$^a$ for imparting intermittent motion to the conveyor is illustrated as removed from the carton machine and diagrammatically disposed adjacent the broken end of the conveyor. The drive for the Geneva movement is taken from the main power source in the carton machine.

The main frame of the present machine is indicated at 22 and may be of fabricated construction for the purposes of casting and assemblage of the various parts of the machine. The power shaft 20 (see Figure 13) extending from the cartoning machine is connected by a coupling 23 to a section of shafting 24 journalled in a cross wall 25 of the frame 22. The section of shafting 24 has a gear 24$^a$ affixed thereto, this gear being in mesh with another gear 26 secured on the extreme end of the main power shaft 37 extending longitudinally of the frame and journalled in the cross walls thereof at its respective ends.

Magazine operating mechanism

A pair of end brackets 28 are mounted on the frame at the respective ends thereof, these brackets having upwardly and rearwardly extending arms. The magazine 29 is mounted on rollers 30 for reciprocation between and on these angular arms. The magazine 29 is reciprocated by means of a cam 31 fixed to an intermediate portion of the power shaft, this cam being of the closed type and having connection with a roller 32 on one arm of a bell crank lever 33. The bell crank lever is journalled in a pair of brackets 34 secured to the rear face of the frame and has two upwardly extending arms 35, each arm being joined by means of a respective link 36 to brackets 37 secured to the underside of the magazine. The links extend virtually parallel to the movement of the magazine for imparting a direct movement thereto. The magazine has a ball bearing roller 30 secured at each corner thereof, these rollers extending beneath the underside of the magazine and rolling on short tracks 38 secured to the inner faces of the arms of the end brackets.

As detailed in Figures 10 and 11, the magazine consists of a plurality of chutes or channels 39, ten in the instance shown, joined in spaced relation by means of cross rails 40, the outer ends of the cross rails being provided with upward extensions 41 having the rollers 30 secured therein. Each chute of the magazine is provided with a follower block 42, the weight of which, due to the inclination of the magazine, presses the stack of packages 43 toward the lower ends of the chutes where they are held against displacement primarily by means of an angle cross piece 44 having one web thereof disposed across the lower ends of the chutes. The magazine is made reciprocable for moving it toward and from the rotary device which extracts the endmost package from each chute, the respective extracting elements of the rotary device being suckers, against the faces of which, the endmost package of each stack is moved by each reciprocation of the magazine.

A device is provided as part of the magazine for preventing the displacement of more than one package at a time from each chute. This device consists of a finger 45 for each chute and packing stripper levers 46. The fingers are mounted on a common cross shaft 47 journalled in the upwardly extending arms 41 of the lower cross rail of the magazine. The shaft 47 carrying the fingers is rocked by means of a cam 48 affixed to the extreme outer end of the power shaft 27, this cam engaging one arm of and rocking a bell crank lever 49 pivoted to the end of the frame, the other arm of the bell crank lever being pivotally connected to the end of a crank lever 50 secured to the outer end of the shaft, carrying the fingers, by means of a link or rod 51. The stripping levers 46 are pivotally mounted at their rear ends on brackets 46ª secured to each chute and each is drawn downwardly by means of a tension spring 46ᵇ secured to the respective lever and the magazine chute.

There are two stripping levers 46 for each chute, one at each side, and these levers are simultaneously rocked by means of a connection to the lower end of the respective finger for the particular chute. The connection between the finger and the levers is in the nature of a cross pin 52 traversing the lower end of the finger and moving in arcuate slots 53 in intermediate portions of the swinging levers. It will readily be seen that as the fingers are swung into the position shown in dot and dash lines in Figure 5, the pins engage the lower ends of the slots and the levers will be moved therewith and swung on their own axis. The levers in each instance have shoes 54 adjustably secured to the undersides thereof for adjustment longitudinally of the chutes by means of screws 55 passing through slots 56 in the levers and entering the shoes.

Figure 5:
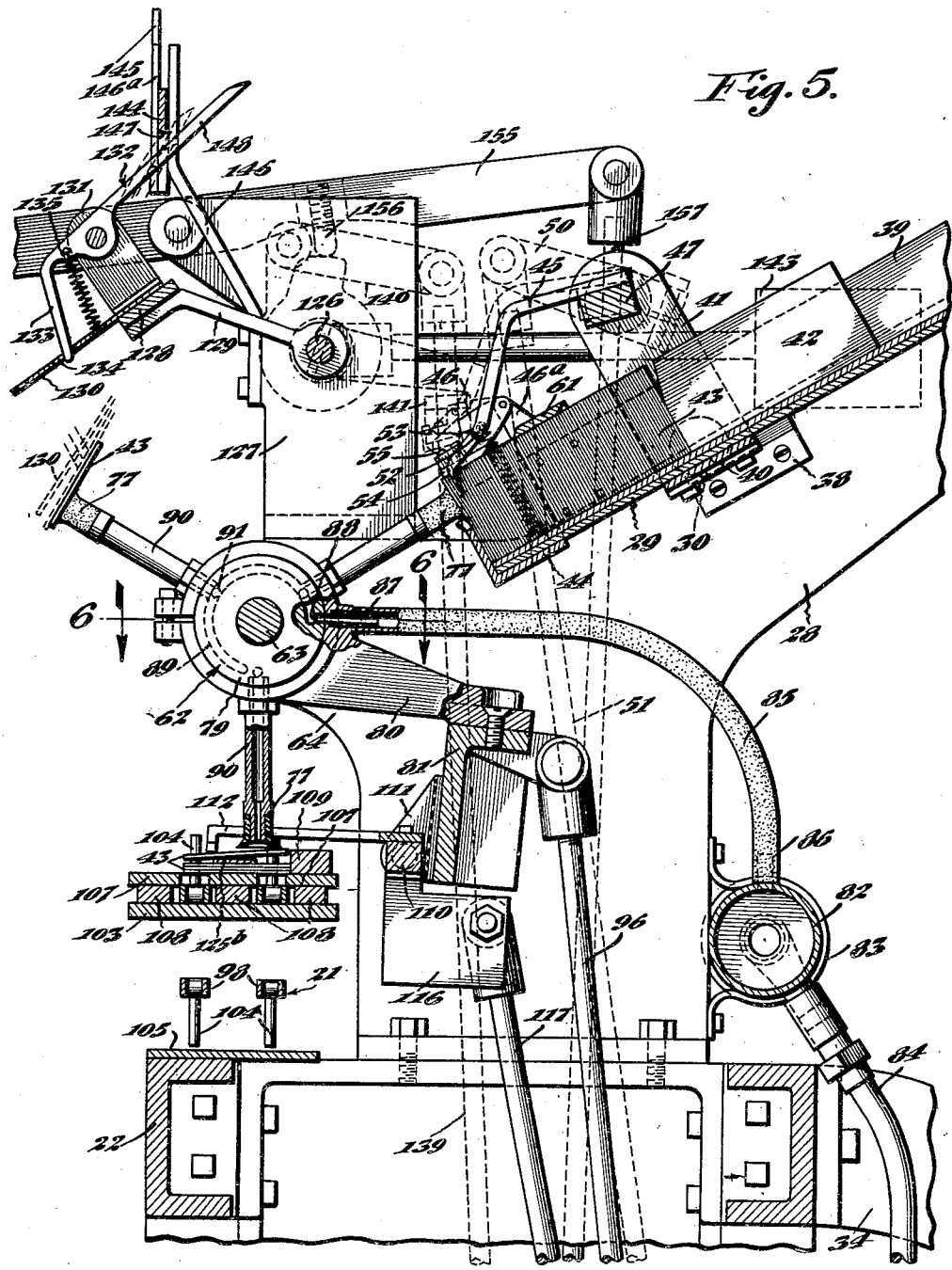
Figure 5 is an enlarged fragmentary sectional view taken in a reverse direction from Figure 4 and illustrating the upper part of the machine, this view illustrating the magazine mechanism in position for extraction of the packages, the testing mechanism retracted, and the stripping mechanism acting to deposit the packages in the conveyor.
Figure 6:
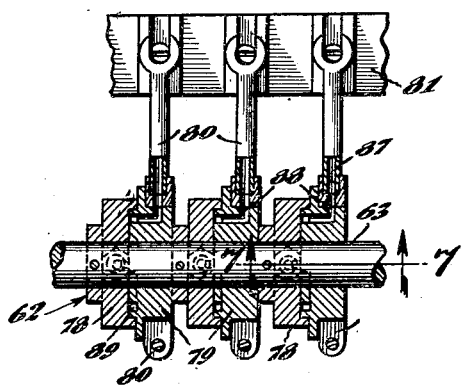
Figure 6 is a sectional view taken on line 6—6, Figure 5, illustrating a valve of the rotary transfer device.

As will be seen by Figure 5, the fingers have sharp points on the ends thereof which enter the respective stacks of packages and sustain the weight thereof while a package is being extracted. In the particular instance shown, three of the packages are left free below or beyond the finger. The shoes on the levers are adjusted so that they engage over the top of the stack, extending down to cover all but the last package in the stack. Thus, the suckers having a rotary motion extract the package laterally and upwardly from the stack and the shoes, the spring 46ᵇ being active, prevent displacement of more than one package at a time, whereas the fingers prevent the weight of the stack from interfering with the ease of extraction of the lowermost package.

Figure 2:
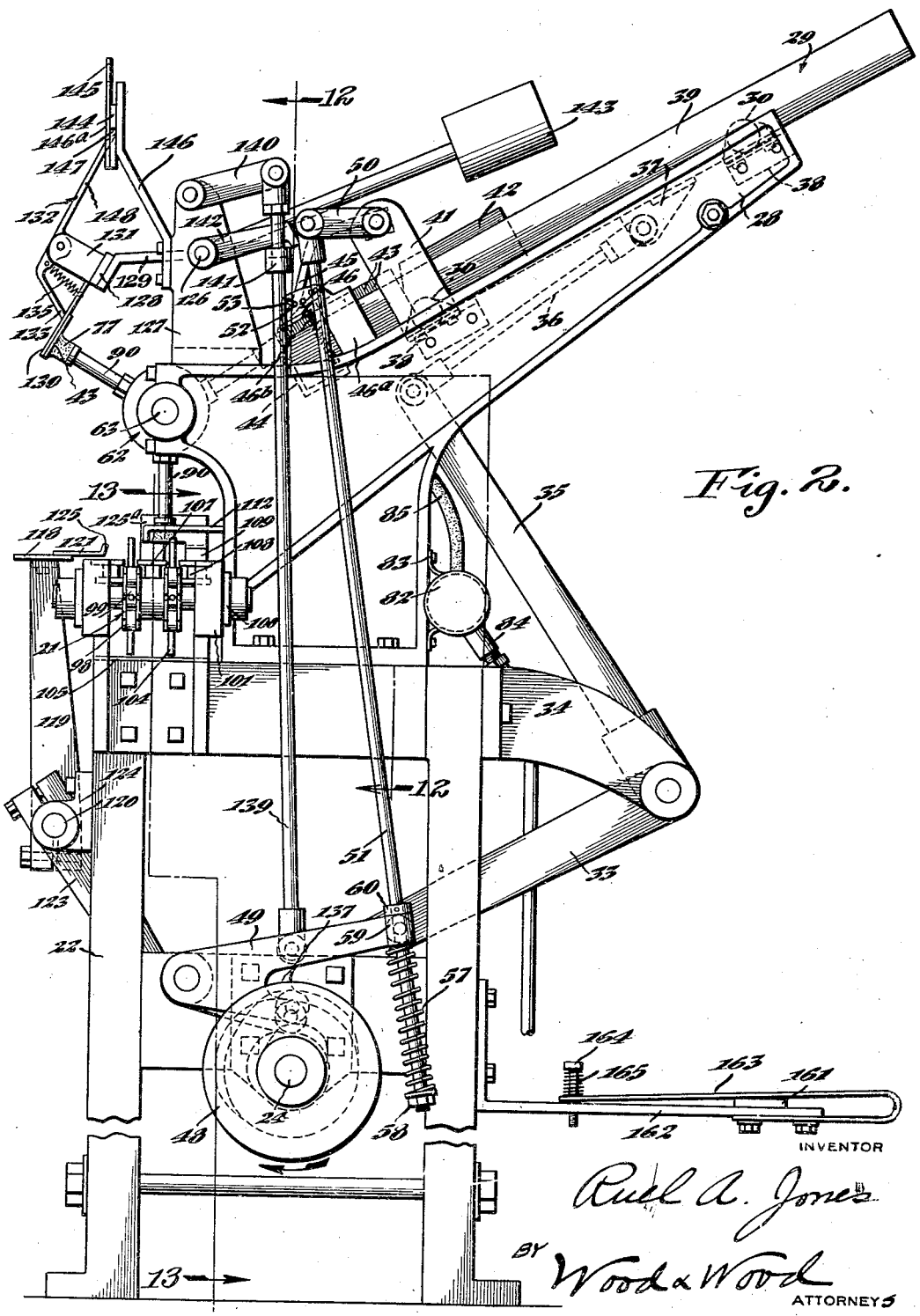
Figure 2 is an end view thereof.
Figure 3:
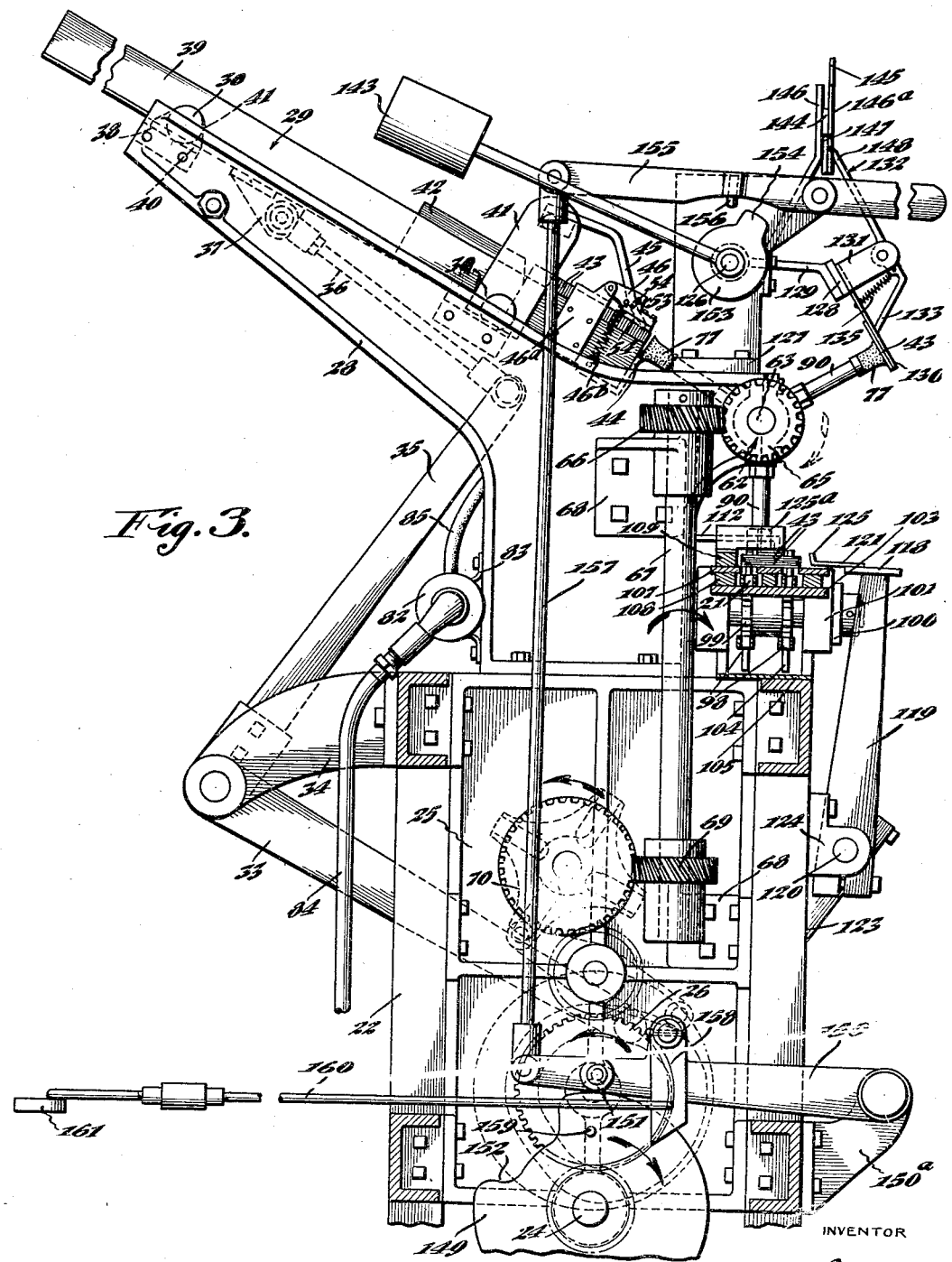
Figure 3 is a sectional view taken on line 3—3, Figure 1.

As shown in Figure 2, the levers and fingers engage the stack under spring pressure. The rod 51 extends beyond and through the arm of the lever 49 and a coil spring 57 surrounds the rod being held against the arm by means of an adjustable nut 58 on the rod. The rod is slidably mounted in a block 59 pivotally mounted on the arm and an abutment collar 60 on the rod engaged by the lever arm which causes a positive lifting of the fingers 45 and levers 46. The yieldable engagement of the fingers and levers with the stack prevents damage to the paper packages, making the pressure applied uniform, and preventing overthrow of the levers.

The brackets which pivot the stripping levers have cross portions 61 which are spaced a distance from the bottom of the chutes slightly greater than the height of the packages, the rearmost edges of these cross portions being rounded off so that the packages pass easily thereunder. These cross portions keep the packages of the stacks aligned in the chutes. The shaft actuating the fingers and the stripping levers is oscillated in synchronism with the movement of the magazine and the movement of the rotary device as will be outlined later in the detailed description of the operation of the machine.

*Rotary transfer mechanism*

The rotary transfer device 62 is mounted on a cross shaft 63 journalled in the end brackets 28 heretofore described, the specific point of journalling being in forwardly extending ears 64 of the bracket. One end of the shaft 63 extends beyond its bearing bracket and has a spiral gear 65 pinned thereto, this spiral gear being in mesh with a second spiral gear 66 pinned to the upper end of a vertical shaft 67 journalled in upper and lower bearings brackets 68, 68, secured to the end bracket and frame of the machine, respectively. Another spiral gear 69 is pinned to the lower end of the vertical shaft, this gear being in mesh with a spiral gear 70 pinned to one end of a stub shaft 71 intermediately journalled in the cross wall 25 of the frame.

The other end of the stub shaft 71 carries the four point star wheel 72 of a Geneva movement, the star wheel actuating the double lever driver 73 of the Geneva movement which is pinned to a second stub shaft 74 immediately below the first. A gear 75 secured on the last mentioned shaft is in mesh with a gear 76 on the power shaft 27. Through this Geneva movement, intermittent rotation is imparted to the rotary device so that it is moved through 120° impulses or arcs of movement.

The three positions of the rotary device accomplished by the Geneva movement are, first, the package extracting position where the suckers of the rotary device cooperate with the magazine, second, the checking or testing position of the suckers, and third, the depositing position where the suckers drop the packages simultaneously in the conveyor belt moving toward the carton filling machine. Therefore, there are three suckers 77 extending radially from each of the collars 78 pinned to the shaft 63.

Figure 7:
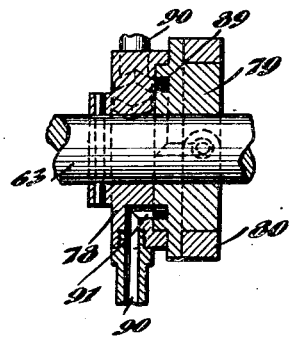
Figure 7 is a sectional view taken on line 7—7, Figure 6, further detailing the valve.
Figure 8:
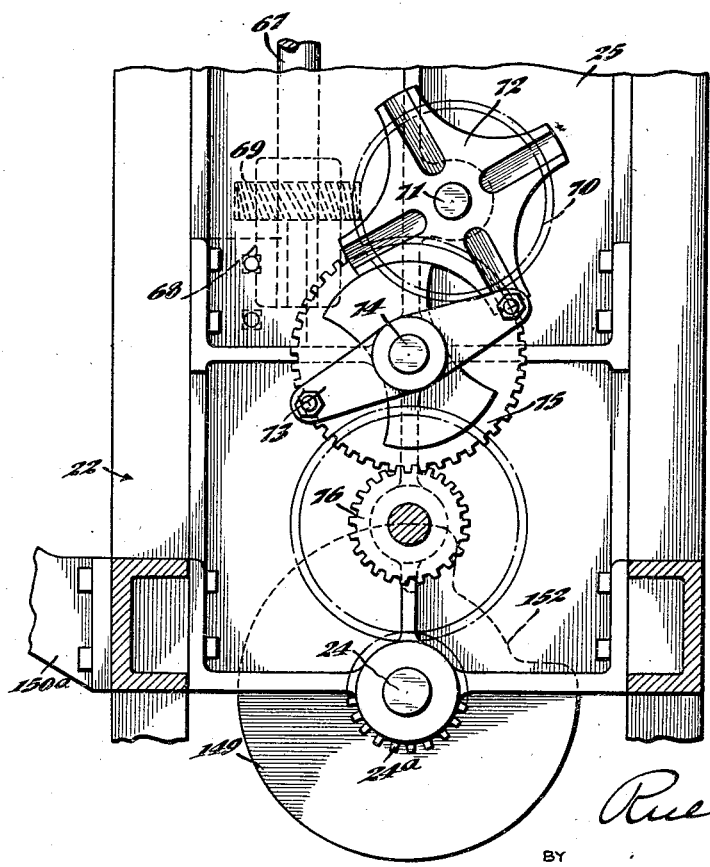
Figure 8 is a sectional view taken on line 8—8, Figure 1, detailing the Geneva movement for imparting intermittent movement to the rotary transfer device.
Figure 18:
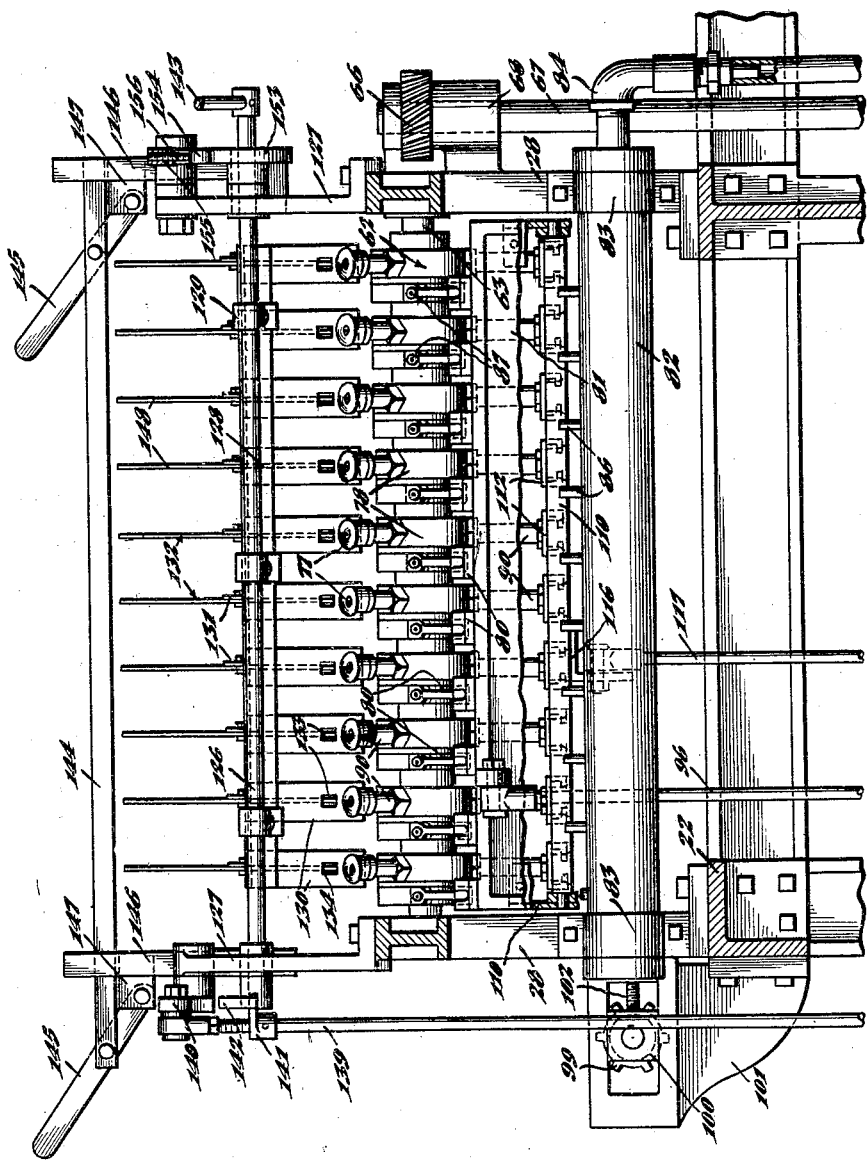

For each collar 78 carrying the three suckers, there is a valve element 79 loosely mounted for rotative movement relative to the shaft, these valve elements being actuated by means of levers 80, the outer end of the levers being secured to a common cross rail 81. The valve elements have air supplied thereto and are moved to control the introduction of the air into the several suckers. As shown, there is a large air manifold 82 secured across between the rear edges of the end brackets by means of straps 83. An air supply conduit 84 is screwed into one end of the manifold tube, and flexible conduits 85, one for each valve element, connect to nipples 86 on the manifold and to nipples 87 extending from the rear sides of the levers 80. The levers 80 are each secured to a respective valve element 79 by clamping a split concentric portion of the lever over a counterturned portion of the valve element (see Figure 7).

A passageway 88 leading from the nipple 87 in each lever extends through the ring portion of the lever and into the body of the valve element, and thence turns at right angles toward the face of the valve and enters a concentric groove 89 in the face of the valve which groove is slightly less than 270° in length. The suckers in each instance are of conventional design, and are secured to the outer end of sucker stems 90. The passageways 91 into which the air is admitted through the groove 89 for rendering the suckers operative extend through the stem 90 of each radially disposed sucker through the body of the collar, turning at right angles to laterally enter the concentric groove.

Rotation of the device of the rotary shaft moves the collars carrying the suckers, whereas the valve elements are normally held stationary and are rotated slightly to control the cutting off of the air when the packages are to be released from the suckers and deposited. The common cross rail 81 operating the valves simultaneously is actuated by means of a cam 93 mounted on the power shaft, oscillating a lever 94 pivoted to a bracket 95 on the frame, this lever having its outer end connected to the common cross rail 81 by means of a link 96.

It will be understood at this point that these various movements are all synchronized by the location of the cams on the power shaft and the arrangement of the levers, to successively perform the various acts or operations on a plurality of packages being moved through the machine.

*Grouping and conveyor mechanism*

The endless conveyor 21 is mounted for movement longitudinally of and beneath the rotary device. This conveyor comprises a pair of endless chains 98 moving around a double sprocket gear 99 journalled in adjustment blocks 100 which are slidably mounted in a bracket 101 secured to the end face of the frame. The ends of the conveyor chains 98, not disclosed, are disposed around a driven double gear 98ª within the cartoning machine, and this power gear is given intermittent motion through any desired mechanism. The chains are tightened by means of adjustment screws 102 engaged through the support bracket and against the inner sides of the slidable bearing blocks 100.

The chains throughout their travel toward the cartoning machine are slidable on a plate or table 103 which is supported at its respective ends on the beforementioned bracket 101 and within the cartoning machine (not shown). As detailed in Figures 5 and 13, each chain has studs or pins 104 extending outwardly at intervals, the pins of the respective chains being aligned. The chains are normally tightened so that there is no dragging of the return lengths thereof, but as a precaution against snagging of the pins 104 on the frame, a plate 105 is provided secured on the top face of the frame and having its end 106 toward the cartoning machine rounded downwardly so as to properly direct the returning depending pins onto its surface.

The aligned pins of respective chains constitute the means for moving the packages along a sectional package table disposed about the chain lengths. This table comprises three plates 107, each mounted on a spacer plate 108, the spacer plates laterally spaced apart to permit free travel of the chain therebetween and of sufficient thickness to provide ample vertical clearance for the chains, the sectional table overhanging the chains but providing sufficient clearance between its respective sections to allow for movement of the pins longitudinally therebetween. The pins, therefore, travel above the surface of the table and slide those packages which are immediately in front thereof along the surface of the sectional table.

In view of the fact that the packages are swung radially and therefore laterally into the spaces between the pins, an abutment plate 109 is secured longitudinally along the rear side of the table for preventing overthrow of the packages and properly aligning the same. The rotary device comes to rest with the packages hanging on its respective suckers, the endless conveyor having been stopped so that the suckers may move between the respective spaced pins thereof. The moment that both the rotary device and the endless conveyor are at rest, the air is cut off by means of the valve movement previously described, and the packages are dropped simultaneously into the respective spaces between the pins.

To insure positive and immediate delivery and in the event that any package should cling to a given sucker, a movement is provided for stripping the packages simultaneously from the suckers. This movement comprises a rock shaft 110 journalled at its ends in brackets 111 secured to the front face of the common cross piece 81 for operating the valve and has a series of fingers 112 extending forwardly therefrom, a pair of these fingers straddling each sucker and having inwardly and opposingly disposed toes.

The rock shaft 110 is actuated by means of a cam 113 on the power shaft 27 actuating a lever 115 pivoted to the bracket 95 on the front of the frame and this lever has its outer end connected to a bracket 116 on the rock shaft by means of a link 117. The fingers, therefore, have a downward movement against the upper face of the packages positively forcing them from the suckers and between the pins.

An additional means is provided for aligning the packages after they are deposited in the conveyor, this means comprising a bar 118 supported on upwardly extending arms 119 secured on a shaft 120 in a position immediately in front and longitudinally of the points where the packages are deposited. There is a pusher finger 121 for each package or packages, or in other words, a pusher for each sucker. The pusher fingers 121 are given a slight inward movement by means of a cam 122 mounted on the power shaft, which cam actuates a lever 123 secured to the shaft 120 pivoting the lower ends of the arms 119. This shaft is journalled in bearing brackets 124 secured on the front of the frame. Each finger has an upwardly turned forward end 125 providing a relatively wide engaging face which is adapted to engage the outer edges of the packages and align the same against the longitudinal abutment member.

To firmly hold the packages against shifting, presser feet 125$^a$ are provided, one below each sucker except the first two. These presser feet 125$^a$ are secured to the abutment plate 109 and have spring ends 125$^b$ extending toward the discharge end of the machine or the direction of package travel, these ends compressing against the table and disposed between the pins of the conveyor. The packages are originally deposited on the top of these presser feet and fed therefrom under the next, the presser feet jointly providing a continuous pressure on the packages being stacked and the pins feeding both those deposited on the presser feet and those below simultaneously.

The relative movements of the rotary device and the conveyor are arranged in a somewhat unique manner of the following nature: In this instance, there are ten suckers provided, which means that there are ten packages brought to the conveyor at each one-third revolution of the rotary device. It has been found that it is possible to run the cartoning machine at twice the speed that it is feasible to operate the counting and grouping machine. For this reason, where speed is desired and only five packages are desired in the stacks ultimately delivered, the compartments of the conveyor as constituted by the pins are moved the distance between centers of two suckers instead of one each time the rotary device is moved and delivers a set of packages.

It will be readily seen by this mode of depositing the packages in the conveyor that after the machine has been primed the ten compartments beneath the suckers will be filled in pairs, that is, the first two will contain one package each and the last two will contain five packages each, the packages being moved relative to the presser feet as set forth until four are beneath the same in the last two compartments beneath the transfer device and five stacks in the two preceding.

The packages by the synchronization of the rotary device and its air cut-off and the endless conveyor, are progressively stacked so that the compartments of the conveyor leaving the region below the rotary device are loaded with the exact number of packages in the group which is desired to be inserted in a carton in the cartoning machine.

*Detector mechanism and power cut-off*

The second position of the row of suckers or the position intermediate the loading and depositing stations of the rotary device is herein termed the checking station. The packages as they are extracted from the magazine are engaged toward one end of the face thereof, namely the upper end. After being swung through 120°, the position of the package is substantially inverted, this position being of utility in the testing operations hereinafter described.

The testing or checking device is mounted on a rock shaft 126 journalled in standards 127 secured on the end brackets of the machine, the shaft 126 being disposed directly above the shaft of the rotary device. A swinging bar 128 is attached to the rock shaft 126 by means of a plurality of arms 129, and a series of plates 130 is secured to the bar, extending laterally and forwardly therefrom, these plates being adapted to engage the outer faces of the packages disposed on the suckers.

Bearing arms 131 are turned upwardly from the sides of the plates 130, these arms having fulcrumed testing fingers 132 pivoted thereto. Each finger 132 is L-shaped, the short arm 133 thereof extending downwardly and engaging in an aperature 134 in the plate, and the lower end of the finger being urged toward the plate by means of a spring 135 attached to and between the finger and the plate.

Each time a row of suckers is brought to this station, the plates are swung against the packages. This oscillation of the testing device is accomplished by means of a cam 136 on the power shaft 27 actuating a bell crank lever 137 pivoted to the frame, the one arm 138 of the bell crank lever being linked by means of a rod 139 to a crank arm 140 pivotally attached to one standard 127. An adjustable abutment 141 is provided on the rod below its upper connection, and this abutment is adapted to engage a crank arm 142 pinned to the outer end of the testing device rock shaft 126. The cam being of the closed type moves the rod up and down in forced movement in both directions. In upward movement the abutment engages the crank arm on the rock shaft and forces the plates against the packages, the rock shaft being returned by means of a weight 143 secured on a rod extending radially from the other end of the rock shaft.

The testing fingers are the means for detecting the absence of a package on a sucker, or that an empty package is in place, and any one of these fingers by displacement is adapted to throw out the power as will be apparent from the ensuing description.

An abutment or trip bar 144 is mounted across the machine immediately above the swinging fingers, this bar being pivotally mounted at each end to intermediate points of swinging levers 145, the lower ends of the levers being pivoted to supports 146 which extend upwardly from the frame. The levers are hand manipulated for raising the bar from its tripping position relative to the fingers when it is desired to prime the machine. The bar when in tripping position is seated on rests 147 formed by the pivot plates secured to the arms 146 for mounting the levers 145, and additional plates 146$^a$ are secured to the face of the blocks 147 to provide slots into which the bar 144 fits when set for tripping. The long arms 148 of the testing fingers extending upwardly are designed to swing under and clear of the trip bar when all the packages are in position and properly fed.

Figure 4:
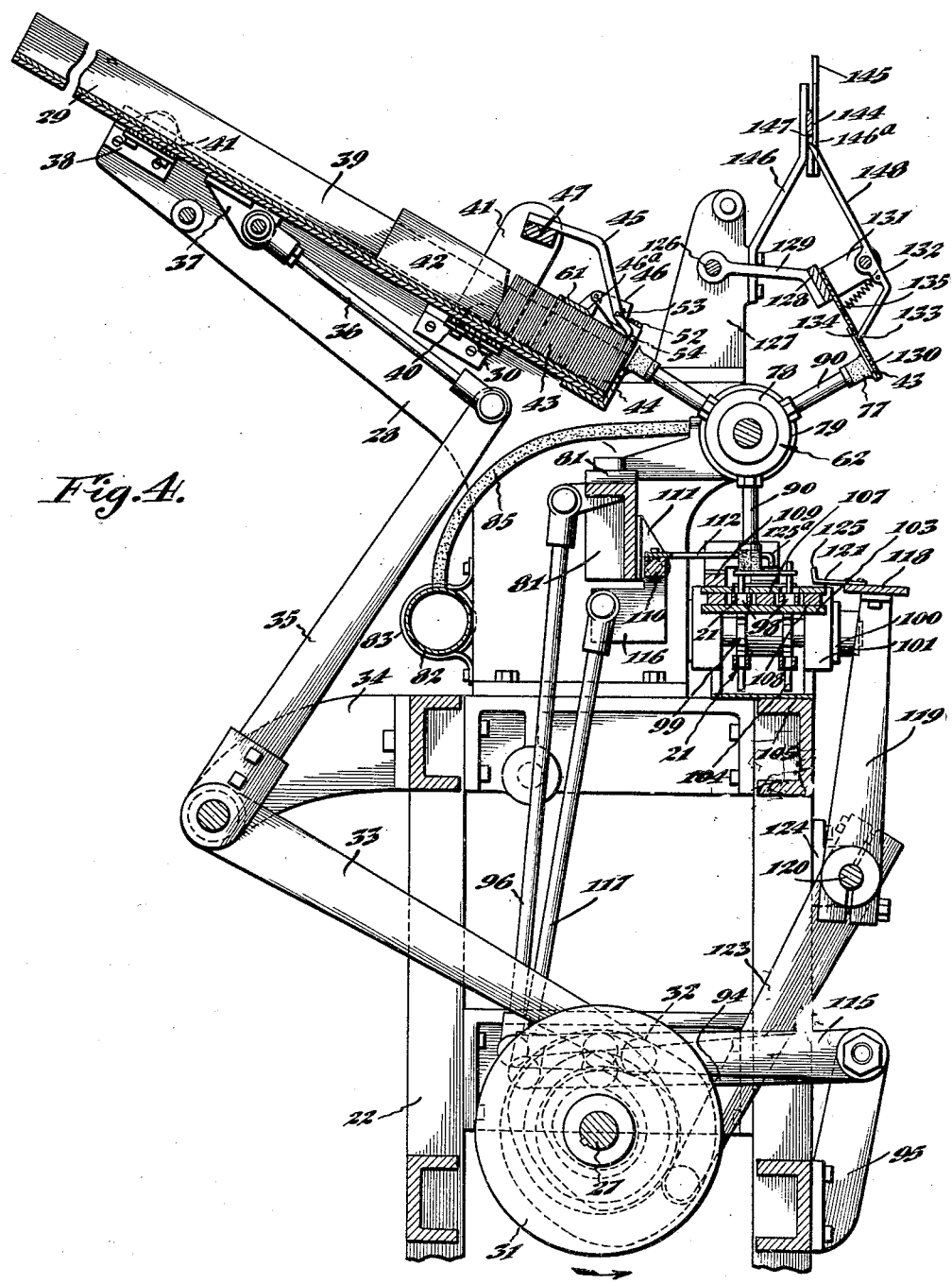
Figure 4 is a sectional view taken on line 4—4, Figure 1.

As shown in Figure 4, when the plates are brought down against the packages, the tip of the lower arm of each testing finger engages the package and if there is a blade in the package, the finger will be forced outwardly against the spring tension. In this position, the testing device is free to be oscillated with none of the fingers catching on the trip bar. However, if it should occur that there is no package in position, or the package is limp and flexible, due to the fact that there is no article therein, the spring will force the arm of the finger through the aperture in the plate and the upper end of the finger will be offset forwardly and upon return movement of the testing device will catch on the bar.

The displacement of any one of the upper ends of the fingers prevents the timed oscillation of the testing device. A tappet mechanism is operated relative to the testing device for controlling the power. To this end a mutilated disk 149 is secured to the power shaft 27. A lever 150 is pivoted to the frame on a bracket 150ᵃ and the swinging end of this lever is supported on the disk 149 by the engagement of a roller 151 secured thereto engaging the face of the disk. A portion of the disk being cut away as at 152, it is necessary to support the lever or to bridge the cut-away portion to prevent the dropping down of the lever which is connected to the testing or detecting mechanism and throws out the power. The lever is, therefore, additionally supported during the movement of the roller across the space of the breach 152 by means of a second disk 153 mounted on the rock shaft and having a raised portion 154 corresponding to the depressed or cut-away portion of the lower disk.

A lever 155 is fulcrumed to the frame above the upper disk. This lever has a stud 156 extending downwardly adapted to engage the raised portion of the upper disk. The raised portion of the upper disk is so positioned that it is in the path of the pin or stud when the rock shaft is retracted and the plate is away from the packages. The outer end of the upper fulcrumed lever is connected to the outer end of the lower lever by means of a link 157. The forward end of the lever 155 serves as the handle extension for controlling the power at will. It follows, therefore, that the lower lever has two forms of support to prevent its dropping and throwing out the power, namely the lower disk and the upper disk, with the depressed and raised portions of the respective disks overlapping to provide continuous support.

Consequently, if the testing device is prevented from rocking back, due to the fact that one of the fingers catches on the abutment bar, the raised portion of the upper disk does not position for engagement by the upper lever and the lever is permitted to drop when the roller on the lower lever comes into the region of the cut-away portion of the lower disk. This drops a depending swinging arm 158 pivoted to the lower lever into the path of a pin 159 fixed to the lower disk and the swinging lever is moved or swung, pulling a rod 160 which is connected to the outer end of the clutch throw-out lever 161.

As shown in Figure 2, a device is provided for frictionally engaging the clutch throw-out arm to hold it against accidental displacement when it is in power throw-in position. This device comprises an arm 162 secured to the frame having an overlapped strip of spring steel 163, one portion of which is secured to the underside of the arm and the other portion held down against the opposite face by means of a screw 164 and compression spring 165, the clutch arm moving laterally between this spring clip and the arm. The spring clip is more open at its outer end than at its inner to permit the lever to slip easily out of thrown-in position after the initial force has been applied through the pin and swinging lever.

*Description of the operation of the machine*

The foregoing description will follow a set of packages through the machine, this set made up of a package from each chute of the magazine, and the synchronous action of the machine after it has been primed will be related later, following this description.

Assuming a stack of packages in each chute of the magazine and the rotary device at a period of rest, the magazine is moved toward the adjacent row of suckers by means of its respective cam and lever. At this time the suckers are in connection with the vacuum and, as the packages are moved against the suckers, each sucker of the row firmly grips the endmost package of the respectively adjacent chute. At this time the fingers 45 and the stripper levers 46 are brought down upon the stacks, the point of the fingers slipping between packages leaving about two or three free at the lower end of each stack and taking the weight of the remainder off of these endmost packages.

The stripper levers 46 pack the packages down into the chute and are disposed so as to leave the endmost package clear for upward extraction when the rotary device withdraws the endmost packages from the chute, that is to say, when the rotary device strips the endmost packages from the stacks aided by the stripper levers retaining the remainder in position. The rotary device then moves one-third revolution and pauses again with a package disposed on each sucker, the magazine moves back, and the fingers and stripper levers move away from the stacks allowing the packages to settle down in the chutes.

The row of packages, one on each sucker, is now disposed in the checking position, in which position the testing plates 130 are engaged against each package by the oscillation of the shaft 126. Assuming a package is in position on each sucker and the packages are properly filled, the testing finger 132 will be properly sustained so as to pass the tripping bar 144 on the return stroke of the testing device. If, however, the above mentioned requisites are not present, the tripping fingers will rotate slightly relative to the oscillating testing device because of failure of support when the plates engage the suckers, that is to say, the tips of the fingers 133 will move through the apertures 134 and the upper ends of the fingers will catch on the tripping bar as the shaft counter-rotates. It only takes one displaced finger to prevent return of the shaft.

As detailed in Figure 9, if the shaft 126 does not return at the proper moment, the lever 155 will be permitted to drop because of failure of the pin 156 to engage the portion 154 of the disk 153, and because of this failure of support at the moment that the roller 151 of the lever 150 is passing over the cut-away portion of the disk 149, the levers 155 and 150, connected by the link 157, will drop simultaneously, throwing the depending swinging arm 158 in the path of the throw-out pin 159, this pin swinging the arm 158 and actuating the clutch throw-out lever 161, thus causing the power to be cut off.

After the testing plates have engaged the row of packages and if they are all properly in position, the rotary device moves one-third revolution to the discharge position. About the time the device is coming to rest with the row of packages immediately above the conveyor 21, the air valve is operated to cut off the vacuum to release the packages simultaneously and drop them into the respective divisions or compartments of the conveyor. When the rotary device is at rest, the air having been cut off, the stripping fingers 112 are actuated to force the packages from the suckers, this movement being provided to insure a positive release and delivery of the packages in the event that they should cling to the suckers.

Immediately following the stripping movement, the aligning bar 118 is actuated to cause the fingers 121 thereof to move the deposited packages back against the abutment plate 109 to thus align them for movement in the conveyor. From the point of delivery, the row of suckers is moved one-third revolution into the position initially described, at which point the vacuum in the suckers is again created and the foregoing cycle repeated.

The machine is active to perform three major operations simultaneously and is described as synchronous in this respect. Simultaneous operations by each row of suckers in its position of pause or rest, at each one-third revolution, are the package extracting, testing, and discharging operations. The other movements described are auxiliary and take place in aid of the major movements. Each time a row of suckers moves away from the position of discharge after depositing a row or set of packages, the conveyor is preferably moved forward the space of two containers.

There are ten suckers in each row and the grouping, as the containers of the conveyor leave the region below the rotary device, is in stacks of five packages in each container. The purpose of having ten suckers instead of five is to reduce the speed of movement of the rotary device one-half, it having been found that it is possible to load the stacks into the cartons at a very rapid rate but far too rapid for the rotary device to supply packages. Thus, as will be observed from Figure 13, after each depositing or discharging operation, and after the machine has been fully primed, there is one package in each of the first two containers of the conveyor, and five in each of the last two containers below the row of suckers. The machine as hereinbefore set forth thus efficiently groups the packages into groups of five, the count being absolutely accurate and the user being assured that there will be no overcount or undercount of packages loaded into the cartons in the carton machine annexed to the machine of the present invention.

Having described my invention, I claim:

1. In a machine of the class described, a package magazine having a plurality of channels, a transfer device having a plurality of carriers corresponding in number to the channels, means for cooperatively moving said magazine and transfer device to dispose a package from each channel on the adjacent carrier of the transfer device, a conveyor mounted relative to said transfer device, means for moving said transfer device and said conveyor in synchronized intermittent motion, and means for releasing the packages from said transfer device into said conveyor, said intermittent motion and release means causing the packages to be progressively stacked in the advancing conveyor.

2. A machine for assembling packages, comprising, a reciprocating plural-channeled package magazine, a rotary transfer device having a row of suckers thereon, the suckers of the row corresponding in number to the channels of the magazine and engageable by the packages thereof, said magazine reciprocating said packages against the suckers, a conveyor moving longitudinally of and below the axis of said rotary device, means for imparting intermittent motion to said rotary device, an air control device for releasing the packages from the suckers, and means for imparting intermittent motion to said conveyor to move the same the distance between centers of the suckers of a row, said air control device and latter means having synchronized movement, whereby each time a set of packages is dropped from the row of suckers, the conveyor is advanced.

3. A machine for assembling and counting packages, comprising, a reciprocating magazine having a plurality of channels, a rotary device having radially extended rows of suckers, means for rotating said rotary device for moving it in intermittent motion through the same number of degrees as the circumferential spacing of the rows, a testing device engaging each row of suckers in the first advanced position from loading position, said device having a trip finger for each sucker, a trip bar for intercepting movement of the testing device in the event that anyone of the fingers is displaced due to absence of a package on a sucker, means for throwing out the power, said means operated by the tripping of the device, a conveyor moving longitudinally of and beneath the rows of suckers in their discharge position, means for releasing the packages from the suckers, and means for imparting feed to the conveyor intermittently and between the release of the packages.

4. A counting mechanism, comprising, a rotary device having three rows of radially extending suckers, a loading station for placing a package on each sucker of a row, a testing station for detecting the absence of a package from any of said suckers in the second advanced position of said row, a conveyor constituting a discharge station for receiving a plurality of packages dropped from the rotary device in the third position of said row, and means for advancing said conveyor intermittently and between the release of said packages.

5. A machine for assembling packages, comprising, a reciprocating magazine having a plurality of hoppers for the packages, a rotary transfer device having a radially extending row of suckers thereon, the suckers of said row corresponding in number to the hoppers of the magazine, said magazine moving radially relative to said transfer device, and means for actuating said magazine and positioning said rotary device in timed order whereby reciprocation of said magazine engages the endmost package in each hopper against the adjacent sucker.

6. A machine of the class described, comprising, a reciprocating magazine, a suction device having a row of suckers adapted to be disposed adjacent the end of the magazine and movable laterally relative thereto, the packages stacked in the magazine so that an endmost package of each stack may be engaged by a respective sucker, means for pressing the stack of packages toward the discharge end of the magazine, fingers engageable with the stacks to sustain the weight of the stacks leaving the endmost package free, and stripping levers engaging the tops of the stacks with the exception of the endmost package so as to prevent the extraction of more than one package from each stack under the lateral action of the suckers.

7. In a machine of the class described, a rotary transfer device having radially extending rows of suckers, means for disposing a package on each sucker in one position of a respective row, a testing device oscillating against said packages at the next position of said respective row, fingers on said testing device, one for each package, said fingers adapted to be sustained by the package on each sucker, a trip bar for intercepting movement of the testing device when one of the fingers is displaced, and means for throwing out the power upon failure of oscillation.

8. In a machine of the class described, a rotary transfer device having radially extending rows of suckers, means for disposing a package on each sucker in one position of a respective row, a testing device oscillating against said packages at the next position of said respective row, fingers on said testing device, one for each package, said fingers adapted to be sustained by the packages on the suckers, a trip bar for intercepting movement of the testing device when one of the fingers is displaced, means for throwing out the power upon failure of oscillation, valve means for releasing said packages from the row in the last position of the respective row, a conveyor for receiving said packages, and means for advancing said conveyor intermittently of said package release.

9. In an assembling mechanism of the class described, a rotary carrier having longitudinally disposed radially extending rows of suckers mounted thereon, a reciprocating magazine moving radially relative to the rotary carrier and having chutes formed therein corresponding in number to the number of suckers in a row for containing stacks of packages, means for intermittently rotating said rotary carrier for positioning the rows successively in the path of travel of the reciprocating magazine for engaging the endmost package of each stack in the magazine against a respectively adjacent sucker, an air valve mounted relative to the rotary carrier for controlling the suction, a conveyor disposed beneath the rotary carrier and moving longitudinally of the axis thereof, said air valve adapted to relieve the suction in each row of suckers as it is positioned over the conveyor for package release onto the conveyor, means for moving the conveyor the distance between centers of the suckers of a row, between each release of packages, and stripper means engaging the packages as the suction is relieved in the successive rows of suckers for aiding release thereof assuring delivery of the packages to the conveyor.

10. In an assembling mechanism of the class described, a rotary carrier having longitudinally disposed radially extending rows of suckers mounted thereon, means for intermittently rotating said rotary carrier, magazine means for engaging a package against each sucker of a row as the carrier pauses, an air valve mounted relative to the rotary carrier for controlling the suction, a conveyor disposed beneath the rotary carrier and moving longitudinally of the axis thereof, said air valve adapted to relieve the suction in each row of suckers as it is successively positioned over the conveyor for package release onto the conveyor, and means for moving the conveyor the distance between centers of the suckers of the row between each release of packages.

11. In a package assembling machine, a rotary carrier having radially extending rows of suckers disposed longitudinally of the axis of rotation of the carrier, means for intermittently rotating said rotary carrier for causing the same to pause the same number of times in one rotation as there are numbers of rows of suckers, a magazine reciprocating toward and from the rows of suckers as they pause successively in one position before the magazine, the magazine containing stacks of packages corresponding in number to the number of suckers in a row, valve means cooperating with the rotary carrier for opening suction to the suckers for engaging a package on each sucker of the row before the magazine, a conveyor moving longitudinally of the axis of and beneath the rotary carrier, said valve means operative for relieving the suction in the rows of suckers as they are successively disposed over the conveyor, and transmission means for moving the conveyor the distance between centers of the suckers after each rotation of the rotary carrier and release of packages.

12. In a package assembling machine, a rotary carrier having longitudinally and radially disposed rows of suckers, means for intermittently rotating said rotary carrier for causing the same to pause the same number of times in one rotation as there are numbers of rows of suckers, a magazine disposed downwardly and radially relative to the carrier and reciprocating toward and from the rows of suckers as they pause successively in one position, the magazine containing stacks of packages corresponding in number to the number of suckers in a row, presser means for sustaining the weight of the stacks of packages, means overlying the stacks for preventing extraction of more than one package as the suckers move laterally from the stacks, valve means cooperating with the rotary carrier for opening suction to the suckers for engaging a package on each sucker of the row before the magazine, a conveyor moving longitudinally of the axis of and beneath the rotary carrier, said valve means operative for relieving the suction in the rows of suckers as they are successively disposed over the conveyor, and transmission means for moving the conveyor the distance between centers of the suckers after each intermittent rotation of the rotary carrier and release of packages.

13. In a package grouping mechanism, a magazine, transfer mechanism, said magazine having a plurality of dispensing chutes therein for supporting a plurality of stacks of packages, said transfer device engaging and removing the endmost packages of the stacks, transmission means for moving said transfer device, a conveyor, means for releasing the packages from said transfer device and depositing the same in a row on the conveyor, a transmission means for moving the conveyor intermittently between each release of packages, said conveyor moved the distance between centers of the deposited packages whereby the last stack of packages on the conveyor leaving the region of the transfer device contains a number of packages equal to the number of packages transferred by the transfer device.

14. In a package grouping machine, a rotary carrier, means for disposing a series of packages in a row on the rotary carrier, means for releasing the packages from the rotary carrier after rotary carrier movement, a conveyor moving longitudinally of the row of packages and adapted to receive the same, compartments on the conveyor for receiving the packages of the row, and means for moving the conveyor the distance of space between centers of the packages of a row.

15. In a package grouping machine, a rotary carrier, magazine means for disposing a series of packages in a row on the carrier, means for releasing the packages from the rotary carrier after movement thereof, a conveyor moving longitudinally of the row of packages adapted to receive the packages in a row, and means for moving the conveyor the distance of space between centers of the packages of a row.

16. In a package assembling mechanism, a rotary carrier having intermittent movement, means for engaging a row of packages on the carrier longitudinally of its axis, a conveyor moving longitudinally of the axis of the rotary carrier and having intermittent motion, means for releasing the row of packages for disposal in a row on the conveyor, and a transmission for synchronizing the movement of the rotary carrier and the movement of the conveyor, whereby after each release of a row of packages the conveyor is moved a distance equivalent to the distance between the centers of the packages of a row.

17. In a package assembling mechanism, a rotary carrier having intermittent movement, means for engaging a row of packages on the carrier longitudinally of its axis, a conveyor moving longitudinally of the axis of the rotary carrier and having intermittent motion, means for releasing the row of packages for disposal in a row on the conveyor, elements on the conveyor defining separate spaces for receiving the packages of a row and engaging the same for positive feed, a transmission for synchronizing the movement of the rotary carrier and the movement of the conveyor, whereby after each release of a row of packages the conveyor is moved a distance equivalent to the distance between the centers of the packages of a row.

18. In a package grouping machine, a rotary carrier having intermittent motion, means for engaging a row of packages on the rotary carrier longitudinally of its axis, a conveyor moving longtudinally of the axis of the rotary carrier and therebeneath and having intermittent motion, the distance of each movement equivalent to the distance between packages, means for causing the rotary carrier to drop the packages onto the conveyor, means formed with the conveyor for dividing the same into compartments for maintaining the dropped packages in groups, a stationary abutment rail extending along the conveyor at the rear edge thereof and a swinging abutment engaging the forward ends of the packages for aligning the same against the rail.

19. In a package grouping mechanism, a transfer device, means for engaging a row of packages on said transfer device longitudinally of its axis, a conveyor moving longitudinally of the axis and therebeneath, transmission means for imparting synchronized intermittent motion to the transfer device and the conveyor, a release mechanism for causing the transfer device to drop a row of packages along the conveyor each time it pauses, fingers for forcibly engaging the packages to strip the same from the transfer means for insuring delivery of the same to the conveyor, and said conveyor having compartments formed along the same for maintaining the dropped packages in groups.

20. In a package assembling mechanism, a rotary carrier, a plurality of rows of suckers disposed longitudinally of the axis of rotation of the rotary carrier and extending radially therefrom, magazine means for engaging a package on each sucker of a row, means for causing the rotary carrier to pause before the magazine means, valve mechanisms associated with the rotary carrier for controlling the suction to the suckers at the above mentioned pause, said valve means also effective for cutting off the suction to the suckers at another position in the movement of the rotary carrier, a longitudinally disposed conveyor adapted to receive the released packages, and transmission means for moving the conveyor a distance equivalent to the distance between centers of the packages after each delivery.

21. In a package assembling mechanism, a transfer device having a row of grippers thereon, a conveyor moving longitudinally beneath the transfer device, means for causing the transfer device to drop the packages in a row on the conveyor, transmission means for intermittently moving the conveyor the distance between centers of the packages of the row after each delivery of packages from the transfer device, partitions formed on the conveyor for dividing the same into compartments for grouping the dropped packages, and presser feet disposed over the conveyor and engaging each group of packages and receiving the delivered row on the upper surfaces thereof, movement of the conveyor delivering the packages of the last released row beneath the next succeeding presser feet.

22. In a package assembling mechanism, a conveyor, means for intermittently moving said conveyor, delivery means for depositing a row of packages upon said conveyor each time it pauses, the movement of the conveyor equal to the distance between package centers, divisions formed on the conveyor for stacking the dropped packages whereby successively dropped rows of packages create increasing stacks in the divisions as the conveyor advances.

23. In a package assembling mechanism, a conveyor, means for delivering a row of packages upon the conveyor, transmission means for intermittently moving the conveyor the distance between centers of the packages of the row, partitions formed on the conveyor for dividing the same into compartments for grouping and feeding the dropped packages, and presser feet disposed over the conveyor and engaging each group of packages and receiving the delivered row on the upper surfaces thereof, movement of the conveyor delivering the packages of the last released row beneath the succeeding presser feet.

24. In a package assembling mechanism, an endless conveyor, means for intermittently moving the endless conveyor, a plate for supporting the upper run of the conveyor, said conveyor consisting of spaced chain links, a table built on the plate above the chain links and slotted longitudinally of the chains and thereabove, pins extending upward from the chains in corresponding positions on the respective chains, means for depositing a plurality of packages on the conveyor table, one between each set of pins, said intermittent movement of the conveyor equal in distance to the spacing between the centers of the pins whereby intermittent advance of the conveyor and depositing of packages causes increasing stacks of packages on the conveyor.

25. In a package assembling machine, a conveyor, transfer means for delivering a row of packages onto the conveyor, an abutment rail extending along the conveyor, swinging fingers engaging the ends of the delivered packages opposite to the abutment for aligning the packages along the conveyor, and means on the conveyor for separately feeding the packages of a row.

26. In a package assembling machine, a conveyor, a carrier having a row of suckers disposed thereon, means for causing the carrier to pause with the row of suckers in longitudinal alignment with the conveyor and over the same, valve means for causing the carrier to release the packages carried by the suckers, an abutment rail extending along the conveyor, and an aligning plate engaging the ends of the delivered packages opposite to the abutment for engaging the packages uniformly against the abutment rail.

27. In a package delivery mechanism, a transfer element having a sucker mounted thereon, a magazine for containing a stack of packages reciprocable toward and from said sucker for engaging the endmost package of the stack against the sucker, means for forcing the stack of packages to the discharge end of the magazine, a finger engaging the stack toward the delivery end thereof and supporting all of the packages except a few at the discharge end, means for operating said finger, a shoe pivoted to the magazine and having operative connection to said finger, said shoe abutting the top of the stack toward the delivery end thereof with the exception of the last package, and means for moving the sucker laterally or toward the shoe for stripping the last package from the stack.

In witness whereof, I hereunto subscribe my name.

RUEL ANDERSON JONES.